Dec. 1, 1970   J. H. McALEAR   3,544,446

SPECIMEN PREPARING DEVICE FOR MICROSCOPES AND THE LIKE

Filed Feb. 21, 1968

INVENTOR.
JAMES H. McALEAR
BY Fred N. Schwend

United States Patent Office 3,544,446
Patented Dec. 1, 1970

3,544,446
SPECIMEN PREPARING DEVICE FOR
MICROSCOPES AND THE LIKE
James H. McAlear, 2780 Buena Vista Way,
Berkeley, Calif. 94708
Filed Feb. 21, 1968, Ser. No. 707,074
Int. Cl. B26d 7/08, 7/10
U.S. Cl. 204—298          4 Claims

ABSTRACT OF THE DISCLOSURE

A device for preparing a specimen for microscopy work comprising a cylindrical body having a specimen holder therein, a cover rotatable about the axis of the body, the cover engaging the body and carrying a knife for severing a frozen specimen supported by the holder upon movement of the cover between a first and second position, and passages in the cover alignable with the specimen upon movement of the cover to the second position to permit shadowing and cast replicating of the specimen, with means for controlling heat transfer to or from the specimen.

---

This invention relates to means for preparing a biological or the like specimen for microscopy examination.

In preparing tissue, etc., for examination by high resolution electron microscopes, it has been discovered that superior results may be obtained by freezing the specimen and then mechanically cleaving the same by using a suitable knife. In doing so, the line of cleavage tends to extend through the plane of membrane structure so as to show the topography of the membranes and organelles. By etching the cleaved surface, the topography is enhanced and a cast replica is made of the surface. By shadowing, i.e., evaporating a suitable material such as carbon-platinum, at an angle onto the etched surface of the specimen, the topography is further enhanced. Thereafter, a cast replica is made by evaporating a carbon layer or the like directly onto the surface. This layer is then removed from the specimen and is examined in the electron microscope. During the above preparation procedure it is essential to maintain the specimen frozen in frost-free condition and to prevent contamination of the surface of the specimen.

The present invention has for a principal object to facilitate the preparation of a specimen and preparation of an accurate cast replica thereof suitable for examination in a microscope.

Another object is to reduce the time necessary to prepare a specimen and cast replica thereof.

Another object is to enable accurate control of fracturing etching, and replicating of a specimen.

Another object is to reduce contamination of the surface of a specimen prior to obtaining a cast replica thereof.

Another object is to provide an inexpensive and easily operable device for the above purpose.

The manner in which the above and other objects of the invention are accomplished will be readily understood on reference to the following specification when read in conjunction with the accompanying drawing, wherein.

Figure 2:
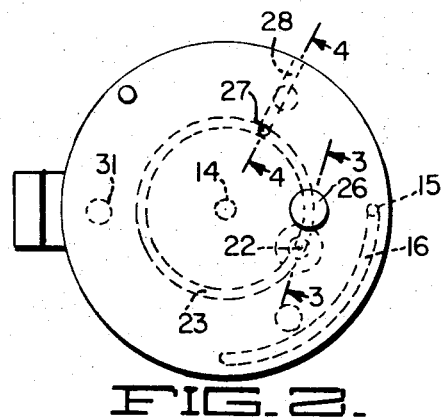
FIG. 2 is a top plan view of the device.
Figure 1:
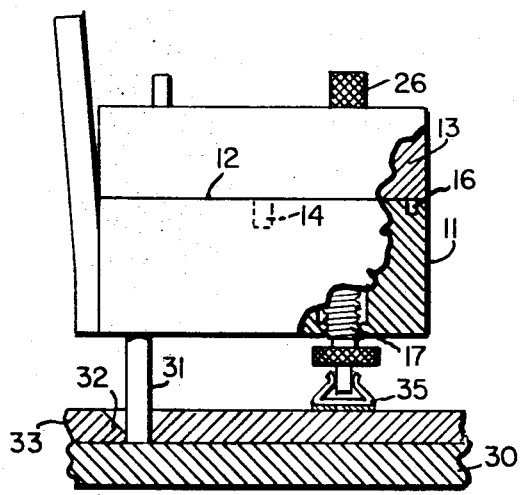
FIG. 1 is a side view of a specimen preparing device embodying a preferred form of the present invention.
Figure 3:
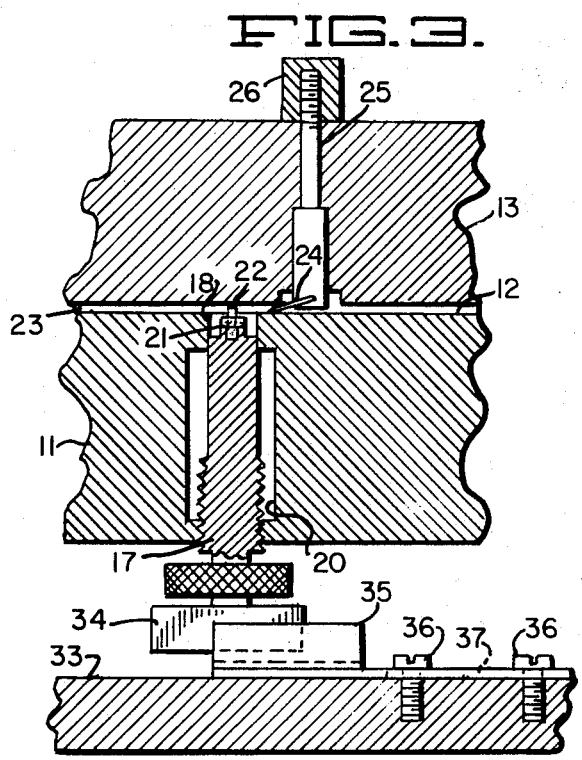
FIG. 3 is an enlarged sectional view taken along the line 3—3 of FIG. 2.
Figure 4:
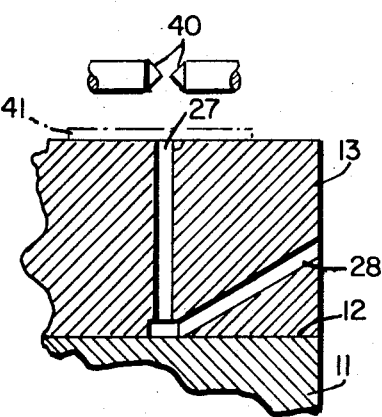
FIG. 4 is an enlarged section view through the replicating and shadowing passages and is taken along the line 4—4 of FIG. 2.

Referring to the drawings, the device comprises a cylindrical body 11, preferably of stainless steel, and having sufficient mass to enable it to remain at freezing temperatures, i.e., −120° C., for extended periods of time. The body has a flat upper end surface 12 engageable by a similar end surface of a cylindrical cover 13, preferably of the same material as the body. The cover is mounted for rotation through a limited angle of movement about the axis of the body 11 and for this purpose it has a central pin 14 thereon fittted within a bearing formed in the body. A limit pin 15 depends from the cover and fits within an arcuate slot 16 formed in the body and extending approximately 90° about the end surface 12.

A specimen holder 17 is provided which is screw threaded into an opening 18 extending through the body 11. The opening 18 is located at a distance from the center of the body equal to approximately one-half the radius of the body. The holder 17 is preferably formed of copper or other material having a high coefficient of heat conductivity, and in order to reduce the transfer of heat between the body and the holder, the opening 18 is enlarged at 20 so as to materially reduce the area of contact between the specimen holder and the body. The holder 17 carries at its tip a pedestal 21 having a cavity therein in which a specimen 22 may be mounted.

A circular groove 23 is formed in the lower face of the cover 13 into which the specimen 22 may project. A knife is carried by the cover and comprises a knife blade 24 having its cutting edge movable along the upper surface 12 of the body 11. The blade is attached to a rod 25 which is held in place in the cover by a knob 26 screw threaded onto the upper end of the rod.

A combined etching and replicating passage 27 is formed in the cover 13 and extends parallel to the axis of the body 11 and at a distance from the axis equal to the distance between the axis and the specimen. A shadowing passage 28 is also formed in the cover and extends at an angle of approximately 30 degrees to the plane of the surface 12. The passage 28 intersects passage 27 at the under surface of the cover 13 so that both passages will be aligned with the specimen when the cover is rotated clockwise to a position limited by engagement of the pin 15 with the opposite end of the slot 16.

The device is intended to be supported from the floor 30 of a suitable vacuum chamber and for this purpose the body 11 has three legs 31 depending therefrom and mountable in sockets 32 formed in a template 33 attached to the chamber floor 30.

Means are provided to effect transfer of heat to the specimen and to control the rate of such transfer as may be needed for certain types of experiments. For this purpose, the specimen holder has a blade 34 integral therewith which, when the device is mounted on the template 33, slideably fits within a clip 35 also preferably having a high coefficient of heat conductivity. The clip is attached to the template 33 by a pair of clamp screws 36 which extend through an elongated slot 37 formed in the clip. By adjusting the clip endwise, the area of contact between the same and the blade 34 may be changed to vary the rate of heat transfer from the template to the specimen holder and, consequently, to the specimen. Alternatively, a magnetic contact may be employed.

In operation, the device may be used in different manners depending on the type of experiment to be followed but preferably, the body 11 and the cover are first cooled to approximately −190° C., as by immersion in liquid nitrogen. The specimen is then rapidly frozen, mounted in the device and the cover is mounted on the body. The assembled device is then mounted on the template 33 within the vacuum chamber. Vacuum is applied, during which time the body slowly increases its temperature while the specimen, through its high heat conductivity contact, warms more quickly to −105° C. Then, by means of suitable manipulating devices (not shown) the cover 13 is rotated clockwise from its position shown in FIG. 2 to a second position wherein the pin 15 limits against the opposite end of the slot 16. During this rotation, the knife 24 cleaves through the frozen specimen and as the cover reaches its second position, the passages 27 and 28 become aligned with the specimen. As the cleaved specimen surface warms between approximately −105° C. and −90° C., water vapor may leave the surface, exposing the surface detail. Alternatively, a pair of carbon electrodes 40 aligned with passage 27 is heated and the resultant radiant energy transmitted by the passage etches the surface of the specimen. A suitable window, indicated by dot-dash lines 41, is preferably located over the passage 27 by a suitable manipulator (not shown) to prevent contamination of the specimen surface during the etching process.

Figure 5:
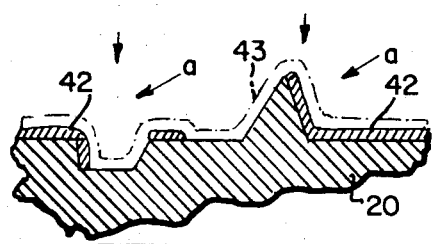
FIG. 5 is a highly magnified cross sectional view of a specimen illustrating the shadowing and replicating layers applied thereto.

FIG. 5 illustrates a highly magnified cross section of the specimen 20 in which ridges and depressions are formed as a result of the above noted etching.

Following the etching procedure, a shadowing operation is effected wherein an arc is struck across a second pair of electrodes (not shown) aligned with the passage 28 and preferably formed of carbon and platinum. Due to the angular location of the passage 28, the evaporated carbon and platinum material is directed onto the surface of the specimen in the direction of the arrows $a$ (FIG. 5) and condensed on the surface to form a shadow layer 42. Subsequently, the window 41 is removed and an arc is struck across the electrodes 40, causing a layer of carbon, indicated by the dot-dash lines 43 of FIG. 5, to be deposited. The specimen is then removed from the holder 17 and is separated from the cast replica which is then inserted in the microscope for examination.

Although the invention has been described in detail and certain specific terms and languages have been used, it is to be understood that the present disclosure is illustrative rather than restrictive and that changes and modificaions may be made without departing from the spirit or scope of the invention as set forth in the claims appended hereto.

Having thus described the invention, what is desired to be secured by United States Letters Patent is:

1. A device for preparing a specimen for microscopy work comprising a solid body having a substantially uniform coefficient of thermal conductivity and sufficient mass to enable the solid body to remain at freezing temperature for a predetermined period of time; surface means on one side of said body defining a definite contour including a cavity defining a treating zone; means for supporting a specimen within said cavity and facing in the same direction as said surface means, said supporting means having a coefficient of thermal conductivity substantially greater than the coefficient of thermal conductivtiy of said body; a solid cover having a substantially uniform coefficient of thermal conductivity less than that of said support means and surface means on one side of said cover defining a contour adapted to mate substantially contiguously with the surface of said body except in the area of said cavity and configured to permit rotation of said cover relative to said body and about an axis common to said body and said cover; means for guiding said cover over said body and about said axis from a first position to a second position, first wall means in said cover defining a first passage extending through said cover and parallel to said axis, whereby a coating material may be applied through said cover to said surface, and second wall means in said cover defining a second passage extending through said cover, at an acute angle to said surface of the body, whereby a coating material may be applied through said second passage to said surface to form a shadow layer, said passages being out of alignment with said specimen when said cover is in said first position and being in alignment with said specimen when said cover is in said second positon.

2. A device according to claim 1 wherein said guiding means guides said cover for movement about an axis eccentric to and parallel to said first passage.

3. A device according to claim 2 comprising means for limiting said cover in said first and said second positions thereof.

4. A device according to claim 3 wherein said body and said cover have adjacent flat end surfaces in engagement with each other.

References Cited

UNITED STATES PATENTS

| | | | |
|---|---|---|---|
| 2,590,725 | 3/1952 | Sanger | 83—915.5 |
| 2,690,699 | 11/1954 | Herbein | 83—167 |
| 2,739,507 | 3/1956 | Cocks et al. | 83—170 |

ROBERT K. MIHALEK, Primary Examiner

U.S. Cl. X.R.

83—915.5, 167, 170